April 7, 1936.  M. B. LINTON  2,036,639

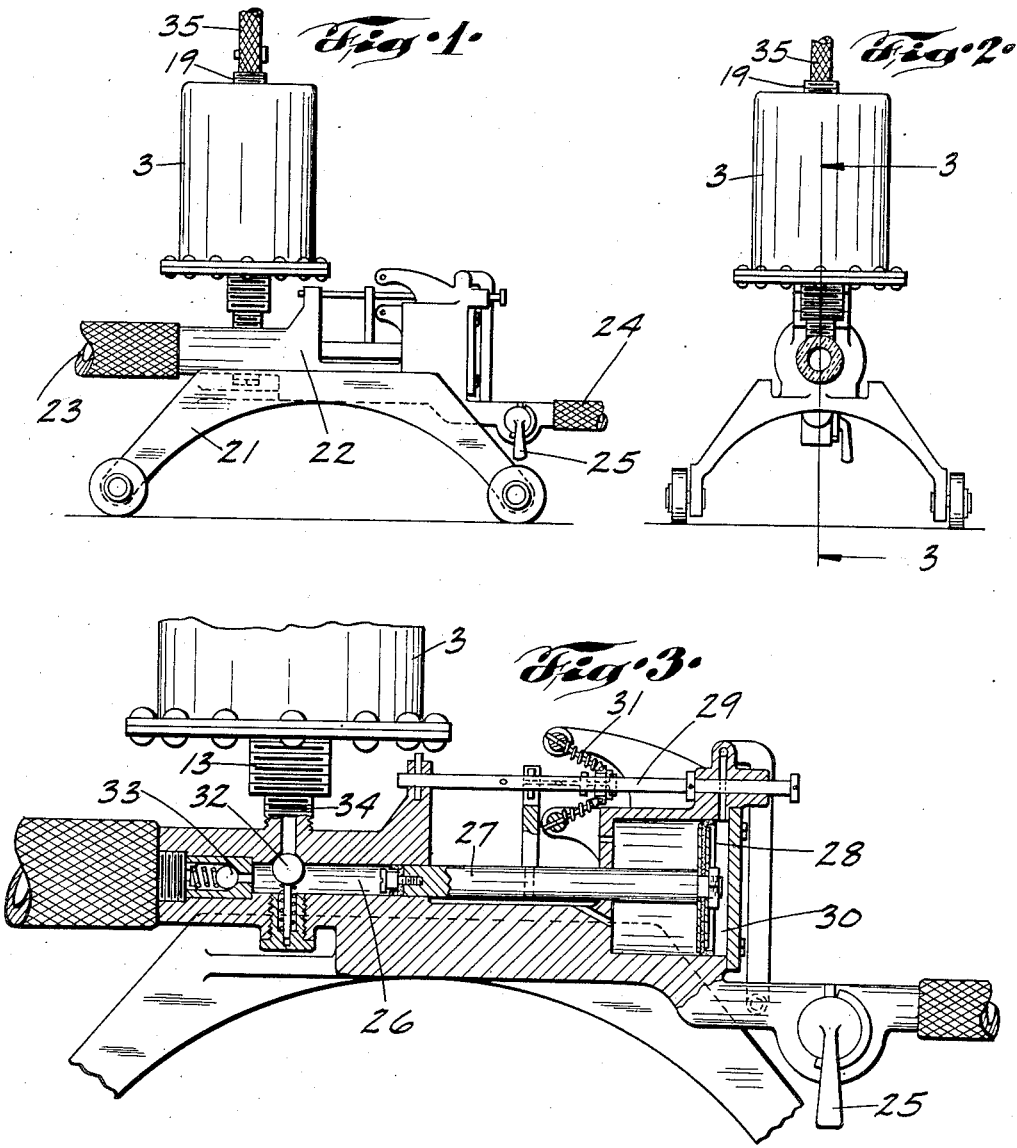

INTERCHANGEABLE GREASE SHIPPING DRUM

Filed Jan. 15, 1932  3 Sheets-Sheet 2

MERWYN B. LINTON
INVENTOR

BY George R. Ericson
ATTORNEY

Patented Apr. 7, 1936

2,036,639

UNITED STATES PATENT OFFICE 2,036,639

INTERCHANGEABLE GREASE SHIPPING DRUM

Merwyn B. Linton, Chicago, Ill.

Application January 15, 1932, Serial No. 586,872

6 Claims. (Cl. 221—47.1)

This invention relates to lubricating devices and particularly to interchangeable grease shipping drums for recharging grease guns and the like. It is well known that great difficulties are experienced in present methods of handling non-fluid lubricants, such as cup greases and the like. This is partly due to the fact that when an operator transfers grease from the original package to the barrel of the grease gun, it is almost impossible to avoid getting air and dirt into the grease. In addition to these difficulties, the handling of the grease is a dirty and generally objectionable job.

I have avoided the above noted conditions by providing an original package container which may be filled at the refinery, the container being provided with suitable connections whereby the grease may be forced in and out at one end and whereby air or some other fluid may be introduced at the other end for displacing the grease. For keeping the two fluids separate, I prefer to use a cylindrical container having a slidable floating piston.

These containers would be filled at the refinery and shipped to the service stations where they are kept in stock in quantities sufficient to insure continuous supply. The container may either be made part of the grease gun, or it may be used to recharge other grease guns, or the lubricant may be supplied to the bearings which are to be lubricated. To recharge a grease gun or supply grease to a bearing, gear housing, or similar device, the connection at the grease end of the container is connected to the outlet of the grease gun and compressed air or some other suitable fluid is introduced to the container on the opposite side of the piston. If it is a grease gun being filled, the plunger of the gun is then withdrawn, and the grease flows from the shipping container into the gun. When the shipping container is empty, it is shipped back to the refinery for refilling.

The invention will be better understood from the drawings in which:

Figure 1 is a side elevation of a grease gun mounted on a portable truck and having my shipping drum connected directly to the grease gun so as to form a reservoir therefor.

Figure 2 is an end view of the device shown in Figure 1.

Figure 3 is a somewhat enlarged sectional view taken along the line 3—3 of Figure 2.

Figure 4:
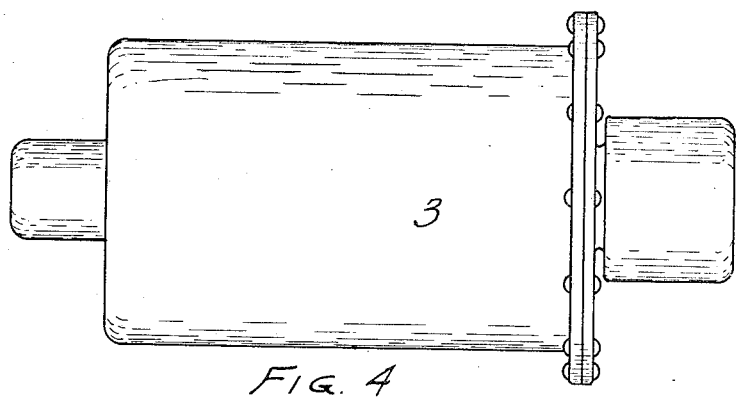
Figure 4 is a side elevation of the device shown in Figures 5 and 6.
Figure 5:
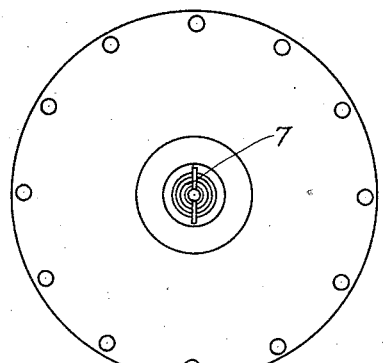
Figure 5 is an end view of the parts shown in Figure 4 showing the grease connection end of the device.
Figure 7:
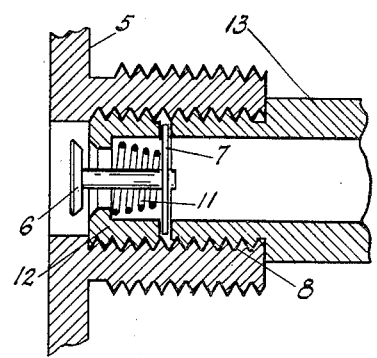
Figure 7 is a fragmentary sectional view of nipple 8 showing it connected to the hose 13 of a grease gun.
Figure 6:
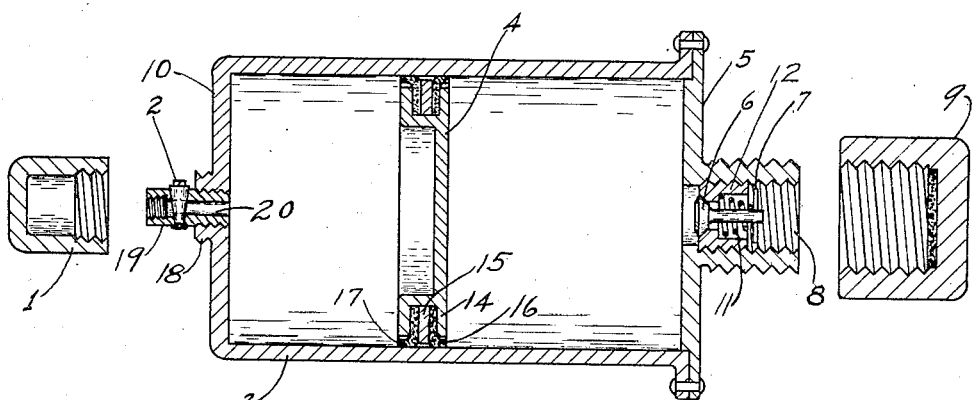
Figure 6 is an exploded cross sectional view showing the grease container and the protecting caps for the air and grease connections.

The reference numeral 3 indicates a rigid housing of cylindrical formation made of metal or other material of sufficient strength to stand the abuse of repeated shipments and rough handling without becoming deformed. The ends of the cylinder 3 are closed by walls 5 and 10 respectively at the grease and air ends of the cylinder. A slidable piston 4 is mounted in the cylinder in such a manner that it may traverse its interior from end to end, and it should be noted that the grease side of the cylinder 4 and the inside of the head 5 have their surfaces parallel so that they may contact when the piston moves to that end of the cylinder, thereby completely emptying the cartridge of grease. It will be understood that the piston need not necessarily be flat, but the pistons and the inside of the cylinder head must conform to each other so that no empty spaces will be left which would remain filled with grease in operation.

The grease end of the cylinder is provided with a valve 6 normally held in closed position by a coiled spring 11 which contacts with the pin 7 passing through the stem of the valve. The valve is carried in a cage 12 screw threaded into the nipple 8 at the grease end of the cylinder. The nipple 8 is provided with threads or any other suitable means by which the container may be connected to a pressure hose, a grease gun, or any other lubricant receiving device. By means of these threads, the container may also be connected to a pressure tank for filling purposes. A suitable cap 9 of heavy and dent proof construction is provided for protecting the threads or connecting means. It will be noted that the stem of the valve 6 projects slightly beyond the cage so that it may contact with and be opened by the end of the receiving hose to which it is connected. It will also be noted that while I have shown screw threads on the inside surface of the nipple 8, a bayonet slot may be provided at this point if desired.

The piston 4 may be made plain, if desired, but I have shown a groove 14 into which is fitted a ring 15 and two oppositely facing cup leathers 16 and 17 to prevent leakage past the piston in either direction. However, very little leakage will occur for the piston is free to float.

At the air end of the container, a boss 18 is provided and screw threaded to receive the protecting cap 1 as shown. A nipple 19 is threaded into the boss and provided with a passageway 20 therethrough. This passageway is controlled by a manually operable valve 2, and the outer end of the nipple 19 may be screw threaded, if desired, for connecting a pressure hose. The end of the nipple 19 will ordinarily be made of the same size as the conventional automobile tire valve body so that the tire hose may be used as an air pressure source if desired.

An important use of the invention is illustrated in Figures 1 to 3 in which the reference numeral 21 indicates a portable truck on which is mounted the grease gun 22 having a discharge outlet 23 which is connected to the parts which are to be lubricated. Air or operating fluid is supplied to the grease gun through the conduit 24 and controlled by the valve 25.

The grease gun itself forms no part of the invention, and it will be sufficient to state that the gun comprises the cylinder 26 having a plunger 27 therein which is reciprocated by plunger 28. The plunger 28 is operated by air or other fluid under pressure in one direction, i. e., toward the left, as indicated in Figure 3. The valve mechanism 29 controls the admission of air to the right hand end of the cylinder 30 in which the piston 28 operates. The valve mechanism is controlled by the snap action device 31, and the piston 27 is returned toward the position which it occupies in Figure 3 by the pressure in the passage 26, due to the pressure stored in the cylinder 3.

An inlet check valve 32 and an outlet check valve 33 are provided, and the container 3 is attached to the nipple 34 on the pump cylinder by means of the threads 8.

As shown in Figures 1 and 2, an air hose 35 may be connected to the nipple 19 of the container. This however, is not altogether necessary and may be omitted, if desired, where the container is to be used with pumps capable of exerting a suction on the intake stroke, as the atmospheric pressure on the plunger 4 is sufficient to discharge any ordinary lubricant when suction is applied at the outlet valve 6.

Figure 8:
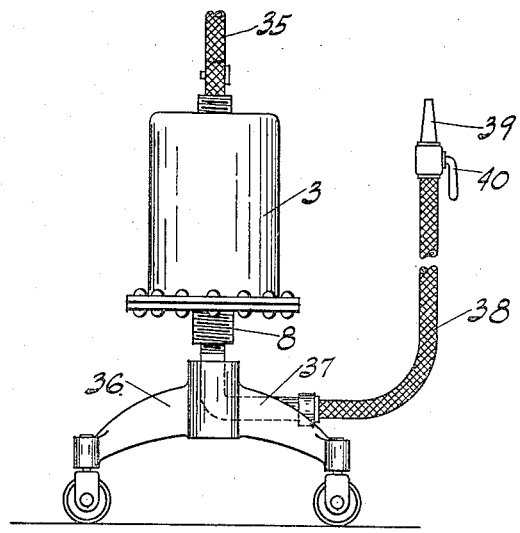
Figure 8 is a front elevation showing my shipping drum mounted on a portable truck having a discharge nozzle for supplying lubricant to various receptacles which are to be filled.
Figure 9:
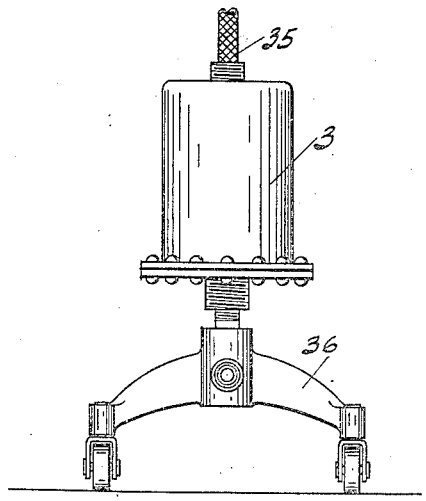
Figure 9 is an end elevation of the device shown in Figure 8.

A convenient means of supplying grease direct from the shipping drum to bearings, gear housings, etc., is illustrated in Figures 8 and 9 in which the reference numeral 36 indicates a spider-shaped truck mounted on four casters, on which shipping drum 3 is mounted by means of threads in nipple 8 and threads on conduit 37 which may be formed as part of the truck casting. A flexible conduit 38 with a suitable nozzle 39 and control valve 40 are also attached to conduit 37. Air or other fluid pressure for the discharging of grease from the drum is supplied through conduit 35.

Figure 10:
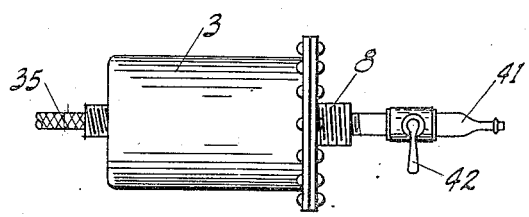
Figure 10 is a side elevation of a shipping drum according to my invention with an adaptor attached thereto for filling hand grease guns.

Referring to Figure 10, I show an adaptor 41 which may be either attached direct to the shipping drum or to the end of the hose 38. The adaptor has its end formed substantially the same as an ordinary bearing lubricating nipple, except that no check valve is used. The adaptor may accordingly be connected to the discharge outlet of any hand grease gun, and the flow of lubricant from the shipping drum to the grease gun is controlled by the manually operated valve 42.

It will be understood that while the hose 35 is shown connected to the shipping drum in each case, it will not be necessary in all cases to leave this hose connected for the shipping drum may be put under pressure when the hose 35 is connected, and then the valve 2 may be closed so as to retain the pressure, and then hose 35 may be disconnected so that the shipping drum can be transported from place to place independently of any air compressor.

In operation, the nipple 19 is connected to a source of fluid pressure to move the piston 4 up against the head 5. The nipple 8 is then connected to a source of grease under pressure, and the grease is forced in through the valve 6, moving the piston 4 clear back against the head 10. It will be understood that for the latter operation, the source of fluid pressure is disconnected from the nipple 19 and the valve 2 is left open.

After the devices are filled, they are shipped to the service stations and stored in suitable quantities to insure a continuous supply. When it is desired to fill a grease gun of the screw plunger type, the nipple 8 is connected to the outlet end of the grease gun hose by means of an adapter, if necessary, and the valve 6 is opened by the contact of the hose with the pin 7. The nipple 8 having been connected to the grease gun, and the air end of the cylinder containing air under pressure, the valve 2 is opened. It will be understood that prior to connection of the grease gun hose with the nipple 8, the plunger of the gun will have moved to discharge position. When the plunger of the grease gun is withdrawn, the pressure from the nipple 19 forces the floating piston 4 toward the head 5 until the grease gun is fully charged. The valve 6 is closed automatically by the removal of the grease gun hose, so that the remaining grease in the container will not be discharged until it is required.

It will be understood that the invention is susceptible of many modifications, and, accordingly, I do not wish to be limited in my protection, except as set forth in the accompanying claims.

I claim:

1. In a device of the class described, a portable carriage, a lubricant shipping drum detachably mounted on said carriage, said drum comprising a cylinder having a floating piston therein and adapted to contain lubricant at one end and compressed air at the other, a lubricant receiving nipple carried on said carriage and adapted to serve as a supporting means for said shipping drum, a dispensing hose connected to said lubricant receiving nipple and a manually controlled valve in said hose.

2. In a device of the class described, a shipping container comprising a chamber divided into two parts by a movable wall, a lubricant receiving and discharging nipple connected to one end of said container, an air receiving and discharging nipple connected to the other end of said container, said lubricant nipple having an inwardly opening valve therein, a portable carriage having a lubricant receiving nipple, said receiving nipple being adapted for connection with said first named lubricant nipple and to serve as the sole means of support of said shipping drum when it is mounted on said carriage, a dispensing hose connected to said lubricant receiving nipple and a manually operated valve in said hose.

3. A device of the character described in claim 2 and further characterized by the fact that the lubricant receiving nipple is constructed and arranged to contact with and open the lubricant receiving and discharging nipple which is mounted on the shipping drum.

4. Grease pack for pressure grease guns comprising a container having a discharge connection projecting from one end adapted to interlock with a coupling on a grease gun, a valve closing the inner end of said connection having a stem extending into said connection and terminating short of the outer end of said connection and adapted to be maintained open by contact with an element of said grease gun when said pack is in coupled position, a detachable protecting cap for said discharge connection, a follower within said container defining with the valved end of said container a reservoir for grease, and connecting means whereby the end of said container opposite said discharge connection may be filled with compressed air.

5. Grease pack comprising a container having a discharge connection projecting from one end adapted to interlock with a coupling on a grease gun, a valve closing the inner end of said connection, having a stem extending into said connection and adapted to be maintained open by contact with an element of said grease gun when said pack is in coupled position and terminating short of the outer end thereof, a follower within said container defining with the valved end of said container a reservoir for grease, and means for applying compressed air to the opposite end of the container.

6. Grease pack for pressure grease guns comprising a container having a discharge connection projecting from one end adapted to interlock with a coupling on a grease gun, a spring closed valve normally closing the inner end of said connection having a stem extending into said connection and adapted to be maintained open by contact with an element of said grease gun when said pack is in coupled position, a detachable protecting cap for said discharge connection, a follower within said container defining with the valved end of said container a reservoir for grease, and means for filling the opposite end of the container with compressed air.

MERWYN B. LINTON.